United States Patent
Kozub et al.

(10) Patent No.: US 10,180,207 B1
(45) Date of Patent: Jan. 15, 2019

(54) STAND

(71) Applicants: Danylo Kozub, Kharkov (UA); Iurii Shapoval, Kharkov (UA); Sergii Pustovarov, Kyiv (UA)

(72) Inventors: Danylo Kozub, Kharkov (UA); Iurii Shapoval, Kharkov (UA); Sergii Pustovarov, Kyiv (UA)

(*) Notice: Subject to any disclaimer, the term of this patent is extended or adjusted under 35 U.S.C. 154(b) by 0 days.

(21) Appl. No.: 15/648,490

(22) Filed: Jul. 13, 2017

(51) Int. Cl.
| F16M 13/00 | (2006.01) |
| F16M 11/18 | (2006.01) |
| F16M 11/32 | (2006.01) |
| F16M 11/14 | (2006.01) |
| H04N 5/225 | (2006.01) |
| G03B 17/56 | (2006.01) |

(52) U.S. Cl.
CPC ............. *F16M 11/18* (2013.01); *F16M 11/14* (2013.01); *F16M 11/32* (2013.01); *G03B 17/561* (2013.01); *H04N 5/2253* (2013.01)

(58) Field of Classification Search
USPC .................................. 248/550, 200.1, 354.1
See application file for complete search history.

(56) References Cited

U.S. PATENT DOCUMENTS

| 1,960,254 | A | * | 5/1934 | McCandless | ........ | G03B 27/465 |
| | | | | | | 355/55 |
| 3,185,423 | A | * | 5/1965 | Jones, III | ............... | A47B 91/16 |
| | | | | | | 108/150 |
| 4,219,268 | A | * | 8/1980 | Uchida | ................... | F16M 11/32 |
| | | | | | | 396/428 |
| 4,445,671 | A | * | 5/1984 | Reuschenbach | .......... | F16F 9/06 |
| | | | | | | 108/147 |
| 4,886,230 | A | * | 12/1989 | Jones | ..................... | F16M 11/10 |
| | | | | | | 248/170 |
| 4,887,359 | A | * | 12/1989 | Hofius | ....................... | B60S 9/10 |
| | | | | | | 33/291 |
| 5,244,170 | A | * | 9/1993 | Shekher | ................. | B64G 1/641 |
| | | | | | | 244/118.1 |
| 5,360,194 | A | * | 11/1994 | Jacobson | ............. | F16M 11/242 |
| | | | | | | 248/300 |

(Continued)

FOREIGN PATENT DOCUMENTS

| CN | 205388211 U | 7/2016 |
| RU | 2387917 C2 | 4/2010 |
| WO | 2011057419 A1 | 5/2011 |

*Primary Examiner* — Monica E Millner

(57) ABSTRACT

A stand comprising a support platform connected to a movable mounting platform via actuators, a movable mounting platform position locking unit, comprising unit for activation and deactivation of the movable mounting platform positioning mode, sensors of applied force connected to each actuator, and an electronic device for actuator length control capable of receiving signals from force sensors about forces applied to actuators prior to activation of the movable mounting platform positioning mode, of taking the force value at the activation of the movable mounting platform positioning mode as conventionally equal to 0, and of further changing the actuator length based on signals from force sensors about forces applied to actuators after activation of the mode of movable mounting platform positioning in the direction where the force on the corresponding force sensor is decreasing, at a speed proportional to the magnitude of force.

9 Claims, 3 Drawing Sheets

(56) References Cited

U.S. PATENT DOCUMENTS

| | | | | |
|---|---|---|---|---|
| 5,406,713 A * | 4/1995 | Oman | G01C 9/06 | 248/188.3 |
| 5,483,903 A * | 1/1996 | Pierce | A47B 9/04 | 108/108 |
| 6,158,134 A * | 12/2000 | Warner, Jr. | G01C 9/26 | 33/370 |
| 6,273,662 B1 * | 8/2001 | Fleckenstein | F16M 11/10 | 248/371 |
| 6,286,441 B1 * | 9/2001 | Burdi | A47B 9/00 | 108/147 |
| 6,330,837 B1 * | 12/2001 | Charles | B25J 11/00 | 74/490.06 |
| 6,530,688 B1 * | 3/2003 | Muller | B25J 17/0216 | 378/197 |
| 6,628,746 B2 * | 9/2003 | Eppler | G01N 21/956 | 378/21 |
| 6,947,666 B2 * | 9/2005 | Chapman | G03B 15/03 | 248/163.1 |
| 7,413,158 B1 * | 8/2008 | Burer | B60N 2/42736 | 248/421 |
| 7,694,367 B2 * | 4/2010 | Zakrzewski | A61B 6/0457 | 5/600 |
| 7,798,452 B1 * | 9/2010 | Wessells | F16M 11/10 | 248/163.1 |
| 7,934,869 B2 * | 5/2011 | Ivanov | A61N 5/1049 | 378/20 |
| 8,172,077 B1 * | 5/2012 | Gray | B25H 1/04 | 190/107 |
| 8,202,273 B2 * | 6/2012 | Karidis | A61B 17/62 | 606/56 |
| 8,333,766 B2 * | 12/2012 | Edelhauser | A61B 17/62 | 606/55 |
| 8,448,369 B2 * | 5/2013 | Hinds, Jr. | F41A 23/08 | 42/94 |
| 8,789,955 B2 * | 7/2014 | Barton | G03B 11/04 | 359/511 |
| 8,956,068 B2 * | 2/2015 | Mekid | F16M 11/043 | 248/176.1 |
| 9,163,774 B2 * | 10/2015 | Orlov | F16M 7/00 | |
| 9,205,566 B2 * | 12/2015 | Schwab | B23Q 1/5462 | |
| 9,316,345 B2 * | 4/2016 | Tarnay | F16M 11/14 | |
| 9,316,888 B1 | 4/2016 | Niemackl | | |
| 9,359,176 B2 * | 6/2016 | Gao | B66C 13/08 | |
| 9,371,958 B2 * | 6/2016 | Johnson | F16M 11/32 | |
| 9,450,430 B2 * | 9/2016 | Fuller | H02J 7/0044 | |
| 9,464,753 B2 * | 10/2016 | Mayer | F16M 11/126 | |
| 2010/0080349 A1 * | 4/2010 | Kalender | A61B 5/4312 | 378/37 |
| 2014/0066701 A1 | 3/2014 | Wilson et al. | | |
| 2016/0342073 A1 | 11/2016 | Myers | | |

* cited by examiner

1

STAND

FIELD OF THE INVENTION

The invention relates to design of stands for positioning of photo, video cameras or other optical devices.

BACKGROUND OF THE INVENTION

Stands are used extensively as movable support for various equipment, for instance, for optical devices. Most stands are designed as tripods, in other words, three-legged stands with adjustable or nonadjustable leg length and a tripod head for mounting and positioning of optical devices. User positioning of optical devices is performed through loosening screw and other clamps, setting the required stand height and incline angle and further fixation of the device in the required position by tightening of the above mentioned clamps. Performing large number of operations each time for device positioning and fixation in the required position is both time consuming and causing quite rapid wear of clamps and locking units and, therefore decrease in their reliability, which may result in dropping and damaging costly equipment. Such wear is determined by constant friction forces in these units and efforts the user applies to the optical devices mounted on the stand. Another drawback of the above described design found in most stands known in the prior art is inability to quickly reposition and fixate the optical devices mounted on the stand in the set position with minimum operations required. So the critical task is to develop a stand free from the above mentioned drawbacks that will allow the user to quickly position optical devices applying minimum effort.

SUMMARY OF THE INVENTION

According to the present invention, the problem of the prior art is solved by developing a stand comprising a support platform connected to a movable mounting platform via actuators, a movable mounting platform position locking unit, comprising unit for activation and deactivation of the movable mounting platform positioning mode, sensors of applied force connected to each actuator, and an electronic device for actuator length control capable of receiving signals from force sensors about forces applied to actuators prior to activation of the movable mounting platform positioning mode, of taking the force value at the activation of the movable mounting platform positioning mode as conventionally equal to 0, and of further changing the actuator length based on signals from force sensors about forces applied to actuators after activation of the mode of movable mounting platform positioning in the direction where the force on the corresponding force sensor is decreasing, at a speed proportional to the magnitude of force.

The Summary of the Invention is provided to introduce the main concept of the invention in a simplified form that is further described below in the Detailed Description of the Invention. The Summary of the Invention is not intended to identify essential features of the claimed subject matter, nor is it intended to be used to limit the scope of the claimed subject matter.

DETAILED DESCRIPTION OF THE INVENTION

Figure 1:
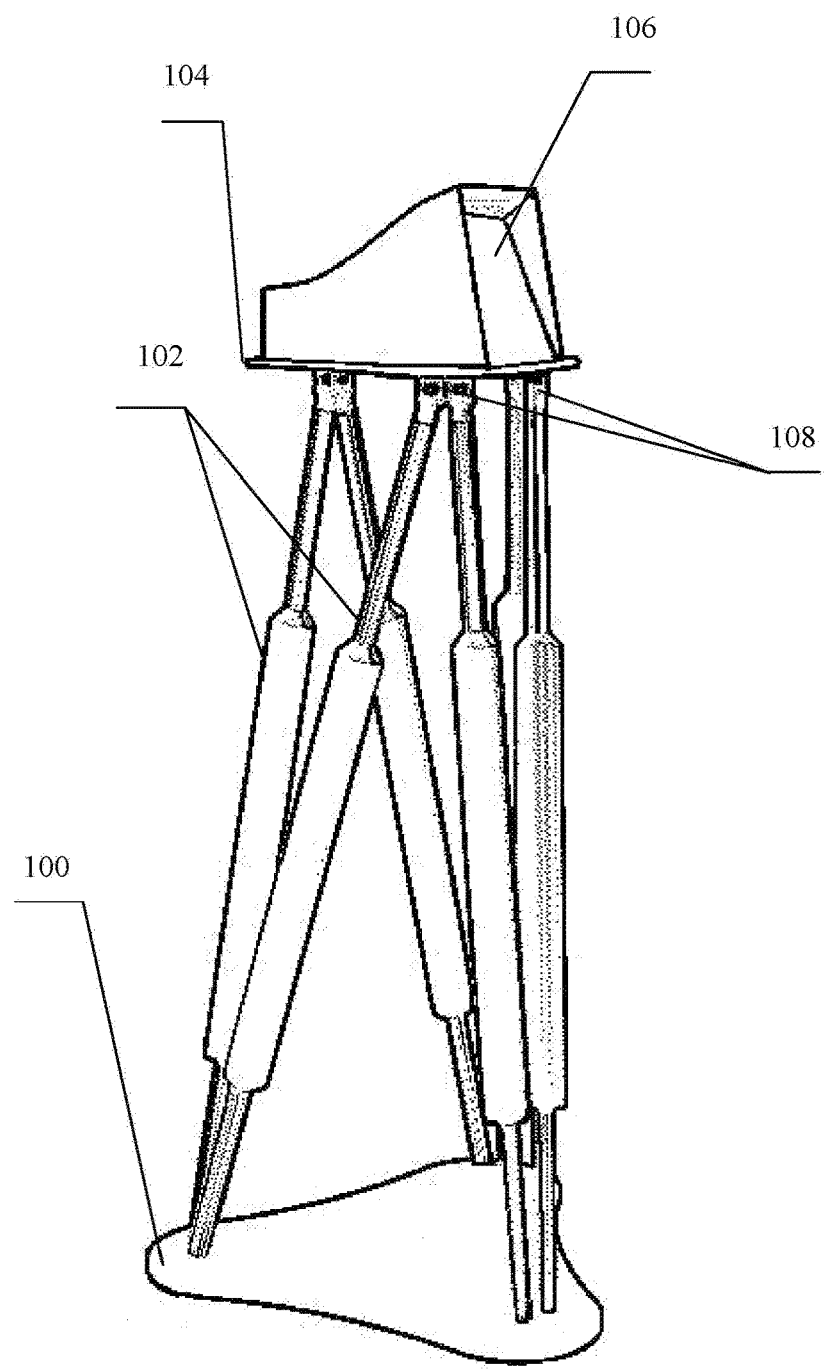
FIG. 1—overall view of the stand.

According to the present invention, the stand is designed based on Gough-Stewart platform and comprises a support platform being the base of the entire stand structure that is connected via actuators to the movable mounting platform serving as a support for optical devices and designed with possibility of its positioning by applying user force, as well as a locking unit of the movable mounting platform, comprising unit for activation and deactivation of the movable mounting platform positioning mode, for instance, in the form of a button, sensors of applied force connected to each actuator, and an electronic device for actuator length control capable of receiving signals from force sensors about forces applied to actuators prior to activation of the movable mounting platform positioning mode, of taking the force value at the activation of the movable mounting platform positioning mode as conventionally equal to 0, and of further changing the actuator length based on signals from force sensors about forces applied to actuators after activation of the mode of movable mounting platform positioning in the direction where the force on the corresponding force sensor is decreasing, at a speed proportional to the magnitude of force. In this case, the positioning mode should be understood to mean the mode enabling positioning of the platform by applying user force, the actuator can be presented as any executive device transmitting force from the control device to the controllable object. Wherein the force should be understood to mean the value relative to zero as measured at activation, and not the absolute force value. According to the preferred embodiment of the present invention, the electronic control device is presented by at least one controller and/or processor, and each actuator comprises at least one electrical, or pneumatic, or hydraulic drive, wherein actuators are connected to platforms by ball or cardan joints.

According to another preferred embodiment of the present invention, force sensors are installed on either the support platform, or the movable mounting platform, or the actuator.

According to the preferred embodiment of the present invention, the unit for activation and deactivation of the movable mounting platform positioning mode is presented by at least one button or other switching mechanism, for instance, a treadle, a touch sensor, voice control.

According to yet another preferred embodiment of the present invention, the movable mounting platform is designed to have a handle, wherein the unit for activation and deactivation of the movable mounting platform positioning mode is installed on the handle.

According to another preferred embodiment of the present invention, the unit for activation and deactivation of the movable mounting platform positioning mode is installed directly on the movable mounting platform.

According to the preferred embodiment of the present invention, power supply of the apparatus can be implemented by using an independent power supply or mains supply.

The aspects of the present invention are described herein with reference to the drawings. FIG. 1 depicts overall view of the stand comprising support platform 100 connected via actuators 102 to the movable mounting platform 104 the optical device 106 is mounted on, and connections 108 of the actuators 102 to the platforms 100 and 104.

Figure 2:
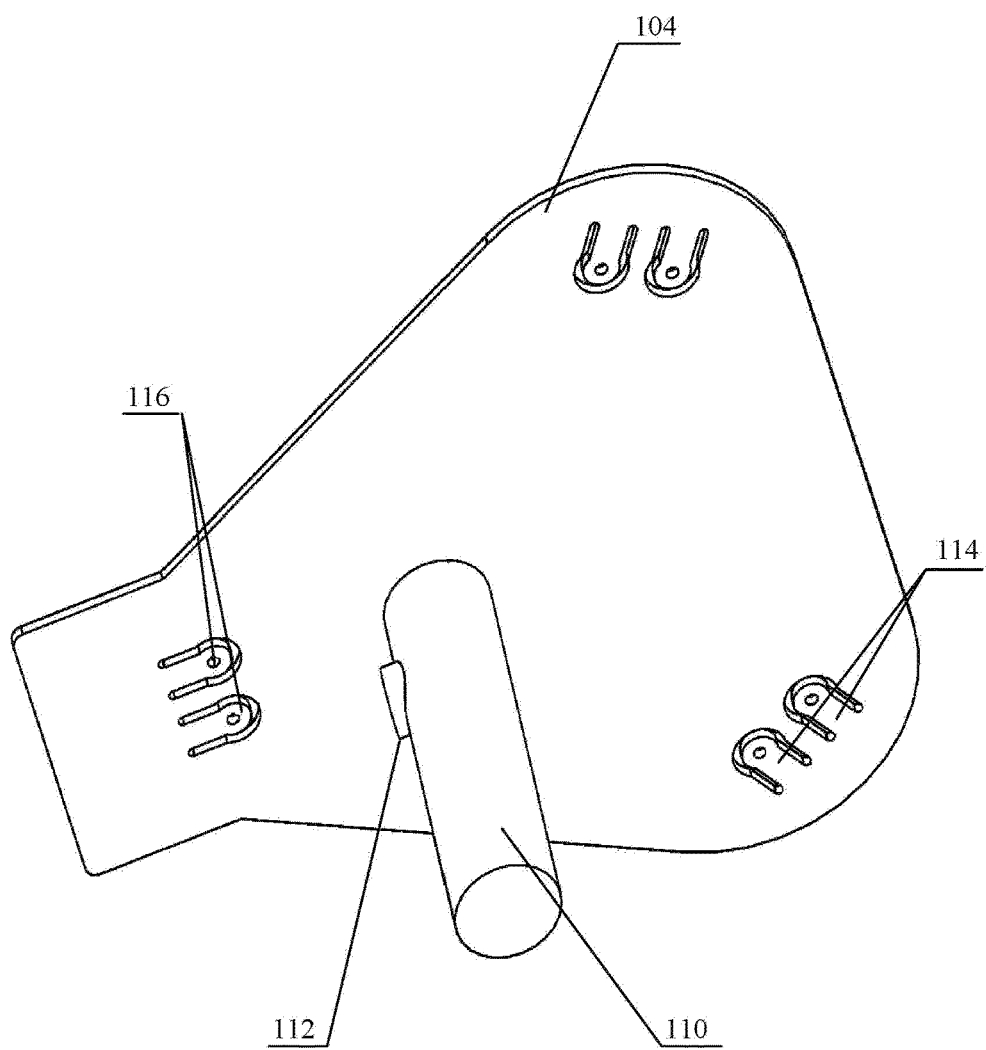
FIG. 2—view of movable mounting platform, perspective view from below.

FIG. 2 depicts the perspective view from below of the movable mounting platform 104, comprising a handle 110 with the unit 112 for activation of the movable mounting platform 104 positioning mode and sensors 114 of force applied to actuators 102.

Figure 3:
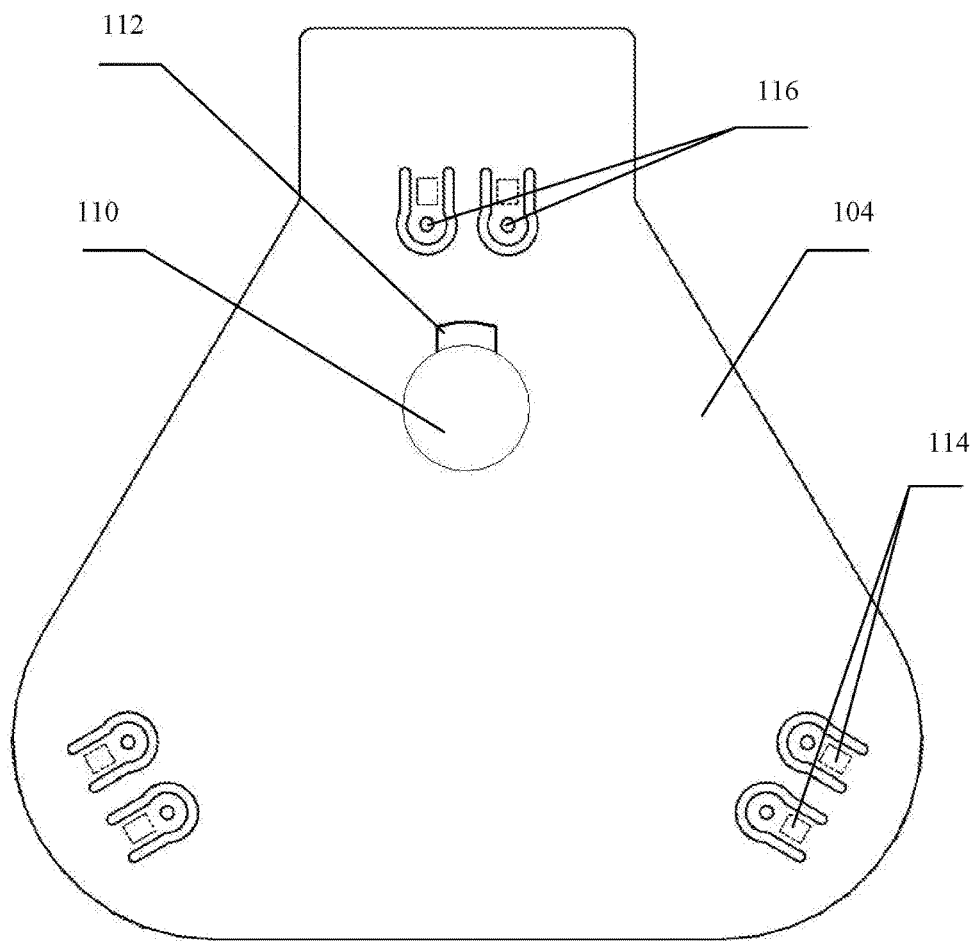
FIG. 3—view of movable mounting platform from below.

FIG. 3 depicts the view from below of the movable mounting platform 104, comprising a handle 110 with the unit 112 for activation of the movable mounting platform 104 positioning mode and sensors 114 of force applied to actuators 102. Wherein sensors 114 of force can be installed in the sites 116 of connection 108 of the actuators 102 to the platforms 100 and 104.

The implementation of the invention is described herein with reference to the most preferred embodiment depicted on FIGS. 1-3 implemented as follows.

The optical device 106, for instance, a camera or a video camera, is installed on the movable mounting platform 104 in the static condition, wherein the force sensors 114 connected to actuators take up the load applied by the device weight on the actuators 102. The corresponding force sensors 114 transmit signals containing data about the load rate to the electronic actuator length control device, while no commands for actuator length change from the electronic control device are being received prior to activation of the movable mounting platform positioning mode.

In order to position the optical device 106, the user holds the handle 110 and applies force to the unit 112, thus activating the movable mounting platform 104 positioning mode. Once the movable mounting platform 104 positioning mode is activated, the electronic control device takes the force values generated on each actuator under the weight of the optical device 106 installed on the movable mounting platform, as conventionally equal to 0, and positioning is performed under forces the user applies to the movable mounting platform, wherein the electronic control device receives signals about the applied user force from the sensors 114, processes them and sends commands to the drive of each actuator 102 for the actuator 102 length change. Based on the received commands, the drives change the length of each actuator 102 in the direction where the force on the corresponding sensor 114 is decreasing, at a speed proportional to the magnitude of force sensed by the sensor. An example of the actuator length change would be decrease of its length under the user applied force directed at the support platform 100.

Once the movable mounting platform 104 is brought into the required position, the user stops applying force on the unit 112, thus deactivating the movable mounting platform 104 positioning mode. When the movable mounting platform 104 positioning mode is deactivated, the electronic control device continues accepting signals from the force sensors 114 about the force applied to the actuators 102, though does not send commands to the drives for the change of their length, therefore the movable mounting platform 104 with the optical device 106 mounted thereon is being fixed in the required position.

Although the design of the stand was described herein in a language specific to the structural features as defined in the appended claims, it should be understood that it is not necessarily limited to the specific features described above. Rather, the specific features described above are disclosed as examples implementing the claims, and other equivalent features and steps can be encompassed by the claims of the present invention.

The invention claimed is:

1. A stand comprising a support platform connected to a movable mounting platform via actuators, the actuators being attached in pairs to three connections on the support platform, crossing over to three connections on the movable mounting platform; a movable mounting platform position locking unit, comprising a unit for activation and deactivation of a movable mounting platform positioning mode; force sensors connected to each actuator; and an electronic device for actuator length control by receiving signals from the force sensors about forces applied to actuators prior to activation of the movable mounting platform positioning mode, taking a force value at the activation of the movable mounting platform positioning mode as conventionally equal to 0, and further changing an actuator length based on signals from the force sensors about forces applied to actuators after activation of the movable mounting platform positioning mode in the direction where the force on the force sensor is decreasing, at a speed proportional to a magnitude of force.

2. The stand of claim 1, characterized in that the electronic control device is presented by at least one controller and/or processor.

3. The stand of claim 1, characterized in that each actuator comprises at least one either electrical, or pneumatic, or hydraulic drive.

4. The stand of claim 1, characterized in that the actuators are connected to platforms by ball or cardan joints.

5. The stand of claim 1, characterized in that the force sensors are installed either on support platform, or movable mounting platform, or actuator.

6. The stand of claim 1, characterized in that the movable mounting platform has a handle.

7. The stand of claim 1, characterized in that the unit for activation and deactivation of the movable mounting platform positioning mode is presented by at least one button or other switching mechanism.

8. The stand of claim 1, characterized in that the unit for activation and deactivation of the movable mounting platform positioning mode is installed on the movable mounting platform.

9. The stand of claim 6, characterized in that the unit for activation and deactivation of the movable mounting platform positioning mode is installed on the handle.

* * * * *